Patented June 22, 1943

2,322,566

UNITED STATES PATENT OFFICE 2,322,566

AMINOPLAST MODIFIED WITH OXANILIC ACID

Gaetano F. D'Alelio, Pittsfield, Mass., assignor to General Electric Company, a corporation of New York No Drawing. Application October 26, 1940, Serial No. 363,037

12 Claims. (Cl. 260—70)

This invention relates to the production of new materials, specifically condensation products, having valuable and characteristic properties that make them especially suitable for use in industry, for example in casting, molding, laminating, coating and adhesive applications, and for other purposes. The invention is concerned more particularly with compositions of matter comprising heat-convertible (heat-curable) aminoplasts modified with oxanilic acid,

The present invention is based on my discovery that thermosetting resins can be prepared by effecting reaction between ingredients comprising an amino (including imino) or amido (including imido) compound, e. g., aminotriazines, urea, thiourea, etc. (or suitable mixtures thereof), an aldehyde, e. g., formaldehyde, and oxanilic acid. The present invention thus provides potentially reactive (heat-convertible) aminoplasts and molding compositions that require no additional curing accelerator of the admixed-catalyst type, or other curing reactant, in order to obtain technically useful products. Such aminoplasts may be termed "self-curing aminoplasts."

As is well known, aminoplasts are synthetic resins derived from amino (including imino) or amido (including imido) compounds, a typical example being urea-formaldehyde resin (reference: Modern plastics. vol. 17, No. 2, October, 1939, page 433; Patent No. 2,214,851, D'Alelio). In the production of aminoplasts it has heretofore been common practice in converting such materials to the insoluble, infusible state to incorporate into the condensation product or into the molding composition a latent or an active (direct) curing catalyst. As pointed out more particularly hereafter, this technique and the final products have not been entirely satisfactory.

In the heat-convertible resinous condensation products of this invention the curing property of the product is imparted thereto by creating a resin molecule having this inherent characteristic. Such resins may be said to be "self-curing" under heat, since the whole resin molecule including the curing reactant that is an integral part thereof cures (hardens) to an insoluble, infusible state. This is a discovery of great practical significance. It makes possible the production of molding compositions of uniform curing characteristics, which compositions yield molded articles free from imperfections, such as blisters, discoloration, etc. Such imperfections are due usually to localized curing that often occurs in resinous materials of the admixed-catalyst type. As the value of the molded article, especially light-colored articles, is materially influenced by its appearance, it is clear that the discovery of any means for decreasing or eliminating entirely the production of imperfect articles that must be scrapped or sold at reduced price is of considerable commercial importance.

As a result of my invention the difficulties attendant the production of molding compositions comprising aminoplasts of the admixed-catalyst type are avoided. With such compositions there was, despite the most careful precautions, considerable variation in the curing rates of the individual batches. Considerable variation also was common even among different portions of the same batch of materials, as evidenced by the appearance of the cured article.

The resin syrups and molding compositions of this invention may be stored for long periods of time without material alteration. In marked contrast the prior heat-convertible aminoplasts, more particularly those containing direct or active curing catalysts such as hydrochloric, ethyl sulfuric, phthalic, chloroacetic, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be made rapidly and economically. The cured compositions have good color, excellent water resistance and surface finish and, in general, meet the strength, hardness and other requirements of the particular service application.

In producing my new condensation products, which may be described more particularly as co-condensation or intercondensation products, the choice of the aldehyde component is dependent largely upon economic considerations and the particular properties desired in the finished product. I prefer to use as the aldehyde reactant formaldehyde or compounds engendering formaldehyde, e. g., paraformaldehyde, hexamethylene tetramine, etc. For some applications I may use, for instance, acetaldehyde, propionaldehyde, butyraldehyde, acrolein, methacrolein, crotonaldehyde, benzaldehyde, furfural, etc., mixtures thereof, or mixtures of formaldehyde (or compounds engendering formaldehyde) with such aldehydes.

The amido, imido, amino or imino component may be, for instance, urea, thiourea, diurea, hydroxy urea, ethanol urea, unsymmetrical diphenyl urea, diethylene triurea, methyl urea, acetyl urea, benzoyl urea, phenyl thiourea, asymmetrical diethyl urea, allyl urea, 2-chloroallyl urea, ethylidene urea, methylol ureas, methylene urea, guanidine, dicyandiamide, guanyl urea, guanyl thiourea, biguanidine, aminotriazines, aminodiazoles, creatinine, guanoline, etc. In many cases the use of an aminotriazine, e. g., melamine, alone or in conjunction with other amido, amino, imido, or imino compounds, is particularly advantageous. Illustrative examples of aminotriazines are triazines containing at least one amino group, e. g., melamine, ammeline, ammelide, formoguanamine, 2-amino-1,3,5-triazine and their substitution products, etc. Derivatives of melamine also may be employed, e. g., 2,4,6-trihydrazino-1,3,5-triazine, melam, melem, melon, 2,4,6-triethyltriamino-1,3,5-triazines, 2,4,6-triphenyl-triamino-1,3,5-triazines, etc. Nuclearly substituted aminotriazines also may be used, e. g., 1-cyano-2-amino-4,6-dimethyl-1,3,5-triazine, 2-chloro-4,6-diamino-1,3,5-triazine, 6-methyl-2,4-diamino-1,3,5-triazine, 2-alkyl-4-amino-6-hydroxy-1,3,5-triazines (for example, 2-methyl-4-amino-6-hydroxy-1,3,5-triazine, etc.), 2-aryl-4-amino-6-hydroxy-1,3,5-triazines (for example, 2-phenyl-4-amino-6-hydroxy-1,3,5-triazine, etc.), and the like. Suitable mixtures of, for example, amino compounds, imino compounds, amido compounds, imido compounds, or amino and amido compounds, imino and amido compounds, amino and imino compounds, etc., such as above-mentioned by way of illustration, may be employed. All of these compounds are aldehyde-reactable organic compounds and all contain at least one reactive amino, amido, imino or imido group. The terms "a urea" and "urea substance" as used generally herein and in the appended claims are used in their commonly accepted meanings. For instance, urea

(NH₂CONH₂)

thiourea, methyl urea, guanidine, biguanidine and dicyandiamide, merely to mention a few of the above list, are embraced by the term "a urea."

In producing these new compositions comprising a condensation product of a plurality of compounds including a urea or equivalent material, an aldehyde and oxanilic acid, the initial condensation may be carried out at normal or at elevated temperatures and in the presence or absence of an acid or an alkaline condensing agent or catalyst. Preferably the reaction between the components is started under alkaline conditions.

Any substance yielding an alkaline aqueous solution may be used in obtaining alkaline conditions for the initial condensation reaction. For example, I may 1 use an alkali such as sodium, potassium and calcium hydroxides, sodium and potassium carbonates, mono-, di- and tri-amines, etc. Best results are obtained by causing the condensation reaction between the primary components to take place in the presence of a primary condensation catalyst and a secondary condensation catalyst. To obtain condensation products having optimum time- or storage-stability characteristics, I have found that the primary catalyst should be a member of the class consisting of (1) nitrogen-containing basic tertiary compounds that are aldehyde-nonreactable, e. g., tertiary amines such as trialkyl (for example, trimethyl, triethyl, etc.) amines, triaryl (for example, triphenyl, etc.) amines, etc., and (2) nitrogen-containing basic compounds that are aldehyde-reactable, for instance ammonia, primary amines, (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, should be a fixed alkali, for instance a carbonate, cyanide or hydroxide of an alkali metal (e. g., sodium, potassium, lithium, etc.).

Various ways may be employed for effecting initial reaction between the components. For example, I may first mix all the reactants and effect condensation between the mixed reactants in the presence or absence of addition agents, for instance condensation catalysts, fillers, other natural or synthetic resinous bodies, solvents, diluents, etc. Alternatively, I may add the oxanilic acid to a partial condensation product of a urea or equivalent material and an aldehyde and effect further condensation between the components. Or, I may first condense the oxanilic acid with an aldehyde, add the resulting product to a partial condensation product of an aldehyde and a urea or equivalent material and then cause the reaction to proceed further. Or, I may condense or partially condense the oxanilic acid with an excess of aldehyde, add a urea or equivalent material to this condensation product and effect further condensation between the components. Or, I may separately partially condense (1) a urea or equivalent material and an aldehyde and (2) oxanilic acid and an aldehyde, thereafter mixing the two products of partial condensation and effecting further condensation therebetween. Still other ways may be employed in combining the components and in producing the unmodified and modified condensation products of this invention, as will be readily understood by those skilled in the art as the description of the invention proceeds. These condensation reactions may proceed under a variety of time, temperature and pressure conditions. The temperature of the reaction may vary from room temperature to the reflux temperature of the reactants at reduced, atmospheric or superatmospheric pressures.

The products obtained as described above properly may be designated as intermediate condensation products. They are thermosetting resinous bodies which alone or mixed with fillers, pigments, dyes, lubricants, etc., may be used, for example, as molding compositions. The modified and unmodified resinous masses are self-convertible at elevated temperatures to an insoluble, infusible (that is, cured) state.

These intermediate condensation products may be concentrated or diluted further by the addition or removal of volatile solvents to form liquid coating compositions of adjusted viscosity and concentration. The liquid products may be used, for instance, as surface-coating materials, in the production of paints, varnishes, lacquers, enamels, etc., for general adhesive applications, in the production of laminated articles and for numerous other purposes. The liquid intermediate condensation products may be used directly as casting resins. Those intermediate products of a gel-like nature may be dried and granulated to form clear, unfilled, heat-convertible resins.

In order that those skilled in the art better may understand how the present invention may be carried into effect, the following illustrative examples thereof are given. All parts are by weight.

Example 1

| | Parts |
|---|---|
| Melamine | 315.0 |
| Urea | 150.0 |
| Aqueous solution of formaldehyde (approx. 37.1% HCHO) | 1000.0 |
| Aqueous ammonia (28% NH₃) | 30.0 |
| Sodium hydroxide in 30 parts water | 0.6 |
| Oxanilic acid | 1.9 |

All of the above components with the exception of the oxanilic acid were mixed and heated for 15 minutes at the boiling temperature of the mass under reflux. The oxanilic acid was added and the mixture brought to boiling. The hot resinous syrup was mixed with 475 parts alpha cellulose in flock form and 4 parts of a mold lubricant, specifically zinc stearate. The wet compound was dried for 1½ hours at 75° C., after which it was molded for 2 minutes at 130° C. under a pressure of 2,000 pounds per square inch. The molded articles did not become distorted when pulled hot from the mold. They were well cured throughout and had surface finish and water resistance. When oxanilic acid is omitted from the above formulation, uncured articles that readily disintegrate in water are obtained.

Example 2

| | Parts |
|---|---|
| Melamine | 315.0 |
| Thiourea | 190.0 |
| Aqueous solution of formaldehyde (approx. 37.1% HCHO) | 1000.0 |
| Aqueous ammonia (28% NH₃) | 30.0 |
| Sodium hydroxide in 30 parts water | 0.6 |
| Oxanilic acid | 1.95 |

Same procedure was followed in making the resin syrup, the molding composition and the molded articles as described under Example 1 with the exception that 490 parts alpha cellulose instead of 475 parts were used in making the molding compound. The molded articles were well cured throughout and were much the same in their other properties as the products of Example 1.

Example 3

| | Parts |
|---|---|
| Melamine | 472.5 |
| Dicyandiamide | 105.0 |
| Aqueous solution of formaldehyde (approx. 37.1% HCHO) | 1200.0 |
| Aqueous ammonia (28% NH₃) | 30.0 |
| Sodium hydroxide in 30 parts water | 0.6 |
| Oxanilic acid | 1.95 |

Same procedure was followed in making the resin syrup as described under Example 1. The hot syrup was mixed with 610 parts alpha cellulose in flock form and 4 parts zinc stearate. The wet compound was air dried at room temperature. The dried compound was molded for 5 minutes at 140° C. under a pressure of 2,000 pounds per square inch, yielding well-cured molded articles.

Although oxanilic acid provides an accelerated cure of condensation products of, for example, urea and formaldehyde, thiourea and formaldehyde, etc., to an insoluble and infusible state, I have surprisingly found that when an aminotriazine, specifically melamine, is one of the starting reactants, then for some unexplainable reason even better acceleration of cure is obtained. The aminotriazine may constitute the sole reactant containing an active

group or it may be used in conjunction with urea or the like without materially lessening the improvement obtained. For optimum results in the curing of such mixed or co-condensation products with oxanilic acid, the amount of the aminotriazine should be at least 25 mol per cent of the molar amount of urea, thiourea, dicyandiamide or other material which when condensed with an aldehyde, e. g., formaldehyde, in the absence of an aminotriazine yields a more slowly curing, soluble, fusible condensation product. Preferably I use at least 0.4 mol of the aminotriazine, specifically melamine, for each mol of urea or equivalent material. Obviously higher amounts may be employed, for example from equimolecular proportions of aminotriazine and urea or its equivalent to from 10 to 100 mols of the aminotriazine for each mol of urea or equivalent material.

The ratio of the urea substance or equivalent material, aldehyde and oxanilic acid to each other may be considerably varied but, in general, it is desirable to use at least one mol of aldehyde for each mol of mixed (total) urea substance or its equivalent and oxanilic acid. Good results are obtained by using at least 1½ mols (e. g., from 1¾ to 5 or 6 mols or more) of an aldehyde, specifically formaldehyde, for each mol of total urea substance or equivalent material and oxanilic acid. Approximately two to three mols aldehyde per mol total urea substance or its equivalent and oxanilic acid usually give very satisfactory results, particularly from the viewpoint of optimum yield of condensation product per unit cost.

The proportion of the oxanilic acid may be widely varied as desired or as conditions may require, but in most cases is within the range of 0.001 to 0.2 mol of the oxanilic acid per mol urea substance or equivalent material. Not exceeding substantially 0.1 mol of oxanilic acid per mol of urea substance or its equivalent often is used. Thus, excellent heat-convertible molding compositions are produced by suitably incorporating a filler into a soluble, fusible resinous condensation product of a mixture comprising one mol of an aminotriazine, e. g., melamine (or a total of one mol of an aminotriazine and urea substance, e. g., urea itself), at least 1½ mols, advantageously 2 to 3 or 4 mols of an aldehyde, e. g., formaldehyde, and not exceeding substantially 0.1 mol of oxanilic acid. In general, the amount of oxanilic acid is so chosen that a heat convertible resin of the desired curing rate is obtained.

The fundamental resins of this invention may be varied widely by introducing other modifying bodies before, during or after effecting condensation between the primary components. Thus, as modifying agents I may use, for example, monohydric alcohols such as ethyl, propyl, isopropyl, butyl, amyl, etc., alcohols; polyhydric alcohols such as ethylene glycol, diethylene glycol, glycerine, pentaerythritol, etc.; amides such as formamide, acetamide, stearamide, acrylamide, benzamide, toluene sulfonamide, benzene disulfonamide, benzene trisulfonamide, adipic diamide, phthalamide, etc.; amines such as ethylene diamine, aniline, phenylene diamine, etc.; phenols; aminophenols; ketones; etc.

The modifying bodies also may take the form of high molecular weight bodies with or without resinous characteristics, for example hydrolyzed wood products, formalized cellulose derivatives, lignin, proteins, protein-aldehyde condensation products, furfural condensation products, phenol-aldehyde condensation products, aniline-aldehyde condensation products, modified or unmodified, saturated or unsaturated polyhydric alcohol-polybasic acid condensation products, sulfonamide-aldehyde resins, water-soluble cellulose derivatives, natural gums and resins such as copal, shellac, etc.; polyvinyl compounds such as polyvinyl alcohol, polyvinyl acetate, polyvinyl acetals, specifically polyvinyl formal, etc.

Dyes, pigments, plasticizers, mold lubricants, opacifiers and various fillers (e. g., wood flour, glass fibers, asbestos including defibrated asbestos, mineral wool, mica, cloth cuttings, etc.) may be compounded with the resin in accordance with conventional practice to provide molding compositions best fitted to yield molded articles of optimum properties for the particular service application.

The molding compositions of this invention may be molded into a variety of shapes under heat and pressure, more particularly at temperatures of the order of 100° to 200° C. For optimum results I prefer to use temperatures ranging from approximately 120° to 180° C. Molding pressures may be varied considerably, but usually are within the range of 1,000 to 10,000 pounds per square inch, more particularly from 2,000 to 4,000 or 5,000 pounds per square inch.

From the foregoing description it will be seen that the present invention provides new and useful compositions of matter comprising heat-curable and heat-cured aminoplasts modified with oxanilic acid. The scope of the invention includes products comprising a potentially heat-curable aminoplast which has been cured to an insoluble and infusible state with oxanilic acid. The invention also provides compositions comprising oxanilic acid and a soluble, fusible potentially heat-curable aminoplast. Specific embodiments of the invention include the reaction product of ingredients comprising a urea, an aldehyde and oxanilic acid; also, heat-curable compositions comprising a potentially reactive condensation product of a mixture comprising, for example, urea, formaldehyde and oxanilic acid, or a mixture comprising an aminotriazine (e. g., melamine), formaldehyde and axanilic acid, or a mixture comprising urea, an aminotriazine, formaldehyde and oxanilic acid, including the products obtained by curing such heat-curable compositions.

My invention further provides thermosetting molding compositions comprising a filler and a heat-curable aminoplast internally modified (chemically united) with oxanilic acid, as well as articles of manufacture comprising such heat-hardened molding compositions. Also included within the scope of the invention is a method of preparing new condensation products which comprises effecting reaction between ingredients comprising a urea or equivalent material, an aldehyde and oxanilic acid. A specific method feature of the invention is the method which comprises effecting reaction between ingredients comprising, for example, urea, thiourea, dicyandiamide, melamine, etc., or appropriate mixtures thereof, and an aldehyde, specifically formaldehyde, in the presence of a condensation catalyst comprising, for example, ammonia or its equivalent and a fixed alkali, adding a small amount of oxanilic acid to the resulting partial condensation product and causing the oxanilic acid to intercondense with the said partial condensation product.

The modified and unmodified resinous compositions of this invention have a wide variety of uses. For example, in addition to their use in the production of molding compositions, they may be used as laminating varnishes in the production of laminated articles wherein sheet materials, e. g., paper, cloth, sheet asbestos, etc., are coated and impregnated with the resin, superimposed, and thereafter united under heat and pressure. They also may be used in the manufacture of arc-extinguishing tubes capable of evolving an arc-extinguishing gas under the heat of the arc, in the production of wire or baking enamels, and for bonding or cementing together mica flakes to make a laminated mica article. They also may be used as fire retardants and sizings, for example in the treatment of cotton, linen and other cellulosic materials. They also may be used as impregnants for electrical coils. The cured products have excellent resistance to heat and water and have a high dielectric strength. Products of outstanding heat, water and arc resistance are obtained when an aminotriazine constitutes one of the reactants.

What I claim as new and desire to secure by Letters Patent of the United States is:

1. A heat-curable resinous composition comprising a potentially heat-curable aminoplast modified with oxanilic acid.

2. A product comprising a potentially heat-curable aminoplast which has been cured to an insoluble, infusible state with oxanilic acid.

3. The reaction product of ingredients comprising a urea, an aldehyde and oxanilic acid.

4. A heat-curable composition comprising a potentially reactive condensation product of a mixture comprising urea, formaldehyde and oxanilic acid.

5. A heat-curable composition comprising a potentially reactive condensation product of a mixture comprising an aminotriazine, formaldehyde and oxanilic acid.

6. A heat-curable composition comprising a potentially reactive condensation product of a mixture comprising urea, an aminotriazine, formaldehyde and oxanilic acid.

7. The reaction product of ingredients comprising melamine, formaldehyde and oxanilic acid.

8. A product comprising the cured composition of claim 5.

9. A thermosetting molding composition comprising a filler and a heat-curable aminoplast obtained by internally modifying a potentially heat-curable aminoplast with oxanilic acid.

10. An article of manufacture comprising the heat-hardened molding composition of claim 9.

11. The method of preparing new condensation products which comprises effecting reaction between ingredients comprising a urea, an aldehyde and oxanilic acid.

12. The method which comprises effecting partial reaction between ingredients comprising melamine, urea and formaldehyde in the presence of a condensation catalyst comprising ammonia and a fixed alkali, adding a small amount of oxanilic acid to the resulting partial condensation product and causing the oxanilic acid to intercondense with the said partial condensation product.

GAETANO F. D'ALELIO.

CERTIFICATE OF CORRECTION.

Patent No. 2,322,566. June 22, 1943.

GAETANO F. D'ALELIO.

It is hereby certified that error appears in the printed specification of the above numbered patent requiring correction as follows: Page 2, first column, line 9, for "ethyidene" read --ethylidene--; line 64, after "may" strike out the numeral --1--; page 3, first column, line 28, Example 1, after "had" insert --excellent--; page 4, first column, line 53, for "ax-anilic" read --oxanilic--; and that the said Letters Patent should be read with this correction therein that the same may conform to the record of the case in the Patent Office.

Signed and sealed this 3rd day of August, A. D. 1943.

(Seal)

Henry Van Arsdale,
Acting Commissioner of Patents.